H. WEINER.
VEHICLE WHEEL.
APPLICATION FILED MAY 10, 1916.
1,235,621.
Patented Aug. 7, 1917.
2 SHEETS—SHEET 1.
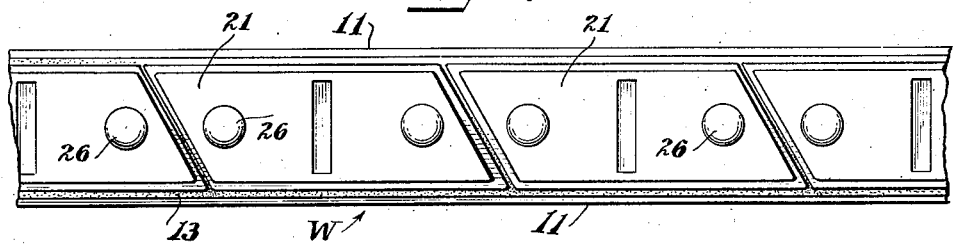
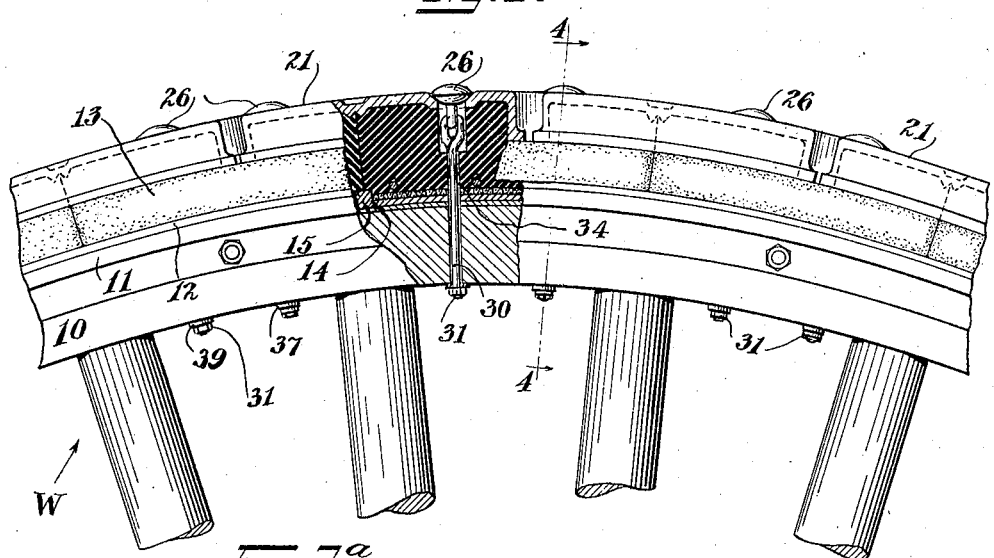
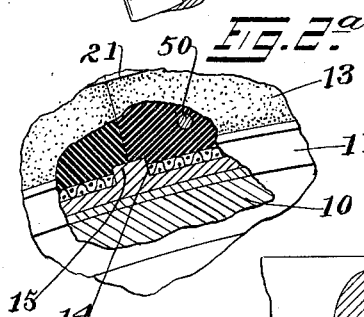
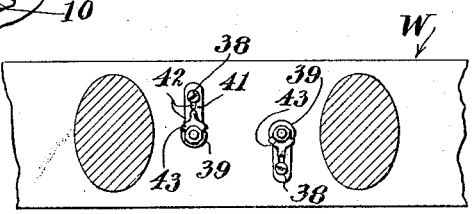
Witnesses:
Chas E Whiteman
H. D. Penney
Inventor:
Harris Weiner.
By his Atty, J. H. Richards.

H. WEINER.
VEHICLE WHEEL.
APPLICATION FILED MAY 10, 1916.
1,235,621.
Patented Aug. 7, 1917.
2 SHEETS—SHEET 2.
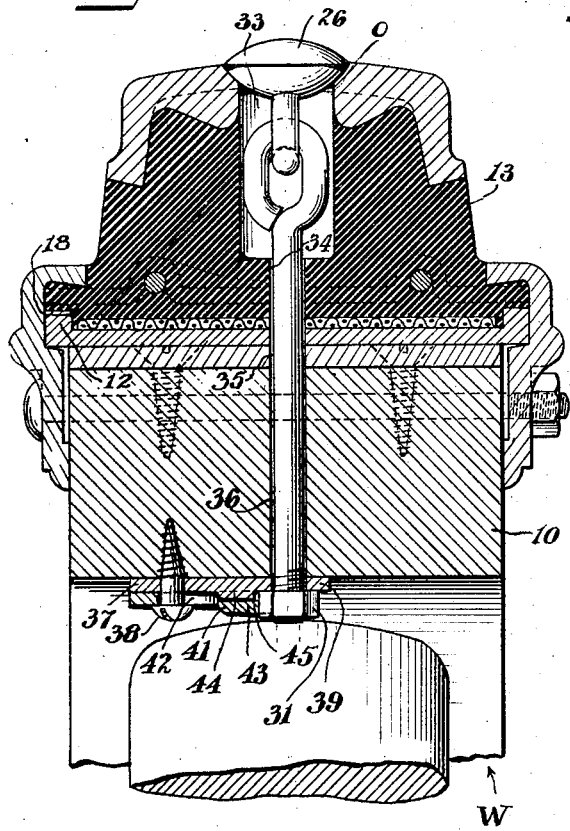
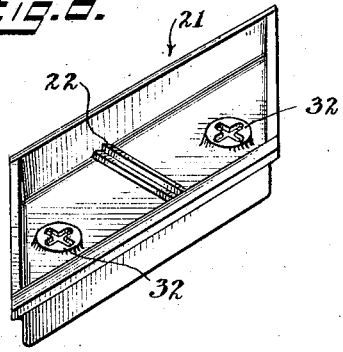
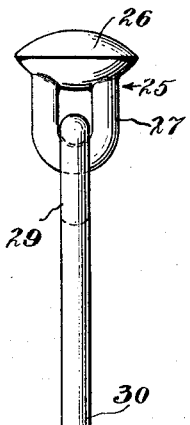
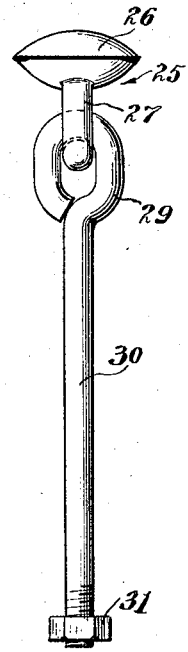
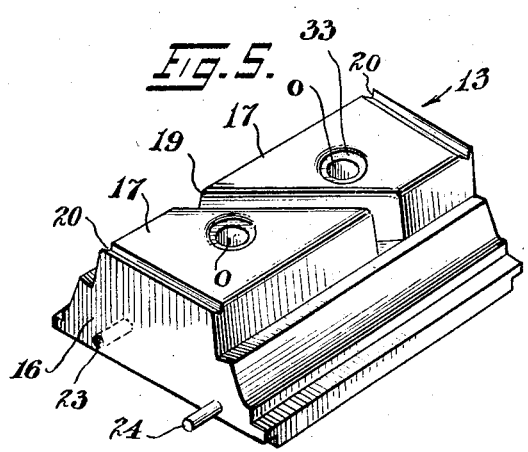
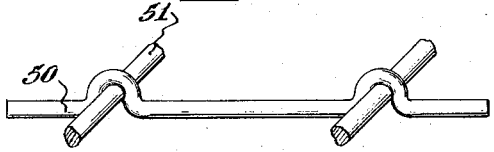
Witnesses:
Chas. E. Whiteman
H. D. Penney
Inventor:
Harris Weiner:
By his Atty. F. H. Richards.

UNITED STATES PATENT OFFICE.

HARRIS WEINER, OF NEW YORK, N. Y.

VEHICLE-WHEEL.

1,235,621.  Specification of Letters Patent.  Patented Aug. 7, 1917.

Application filed May 10, 1916. Serial No. 96,528.

*To all whom it may concern:*

Be it known that I, HARRIS WEINER, a subject of the Czar of Russia, residing in New York, N. Y., have invented certain new and useful Improvements in Vehicle-Wheels, of which the following is a specification.

This invention relates to the general class of vehicle wheels, and more particularly to armors or protectors for tires.

The main object of the present invention is to provide an arrangement in which resilient blocks are used as the main body of a tire, with a segmental metallic shield to protect the same.

Another object of the invention is to provide a tire composed of a plurality of resilient blocks such as solid rubber blocks, and a plurality of metallic segments which coöperate with one another and their fastening means, so that when certain of the fastening means are impaired, or even some of the metallic segments entirely detached in the course of wear, the tire will still present an uninterrupted continuous tread that will not materially detract from the efficiency of the wheel.

A further object of the invention is to provide a combination of rubber blocks and a metallic segmental shield, the segments of which shield will be flexibly mounted to move longitudinally within certain limits and be sufficiently confined to prevent binding one with the other.

A still further object of the invention is to provide fastening means for an arrangement embracing rubber blocks and metallic plates which will permit longitudinal movement of the metallic plates but anchor them against lateral movement.

And a still further object of the invention is to provide an arrangement of metallic plates on a cushion which will coöperate with one another to prevent the formation of sudden breaks between them, to which end the segmental plates are provided with angular conformations having pointed ends which are so disposed alongside of one another that when, in the course of the operation of the wheel, before one of the raised conformations has receded from the roadbed sufficiently to entirely clear therefrom, the next or adjacent conformation will have already come into contact with the road-bed.
These and other features, capabilities and advantages of the invention will appear from the subjoined detail description of one specific embodiment thereof, illustrated in the accompanying drawings in which—

Figure 1 is a fragmental plan view of one form of tire armor.

Fig. 2 is a fragmental elevation partly in section of a portion of a wheel and the tire armor illustrated in Fig. 1; Fig. 2ª is a fragmental sectional view of the composite tire.

Fig. 3 is a fragmental view looking at the inside of the rim of the wheel equipped with the form of tire armor illustrated in Fig. 1.

Fig. 4 is a transverse sectional view showing the felly and tire and related parts.

Fig. 5 is a perspective view of one of the rubber blocks detached.

Figs. 6 and 7 are elevational views at right angles to one another showing in detail the particular fastening means used in the present device and forming a feature of the invention.

Fig. 8 is a perspective view of a plate looking at the inside thereof.

Fig. 8ª is a perspective view illustrating the relative positions of the reinforcing wires.

In the embodiment shown, a wheel W having the felly 10 is equipped with a rim 11 having the lateral flanges 12 to form an annular seat for the rubber blocks 13. The blocks 13 are provided with laterally extending grooves 14 to engage the laterally extending ribs 15 disposed in the annular seat formed by the flanges 12.

The blocks 13 each comprise a base member 16 and two raised conformations 17. Along both sides of the base member there are provided longitudinally extending grooves 18 which register with the flanges 12 of the rim. Each of the blocks in the present instance is provided with two of the aforesaid laterally extending grooves 14.

The raised conformations 17 are preferably spaced from one another by a diagonally extending recess 19 and at the free ends provided with laterally extending rabbets 20.

To cover the rubber blocks 13 and form the tread of the tire a segmental metallic shield is provided comprising a plurality of metallic plates 21 which are preferably trough-shaped to extend over two raised conformations 17 of two adjacent blocks 13, the blocks 13, and plates 21, being disposed in a staggered relation to one another.

About midway between the ends of the metallic plates 21 there is formed a depression 22 which is adapted to register with the rabbets 20 of two adjacent blocks. The ends of the base members of the blocks 13 are each provided with a recess 23 and a dowel pin 24 to register with a corresponding dowel pin 24 and recess 23 in an adjacent block 13, this arrangement being provided to more closely unite the blocks with one another and thereby form a substantially annular cushion.

The ends of two adjacent plates 21 are preferably spaced from one another as shown in Figs. 1 and 2, so that when, in the use of the tire, one of the plates 21 is pressed by the load being carried, it will not contact with the adjacent plate 21 to result in an injurious binding. By the foregoing arrangement it will be seen that the blocks 13 afford a resilient or flexible seat for the plates 21, flexibly guiding them, and reinforcing them to prevent their distortion, the blocks 13 substantially filling up the trough-shaped conformations of the plates 21.

For properly securing the plates 21 and blocks 13 to the wheel, fastening means are provided each comprising a head 25 (see Figs. 6 and 7) having a rounded upper face 26, a rounded under face and a shank 27 extending downwardly from said under face and terminating in an eye 28 receiving an eye portion 29 of a tie rod 30 screw-threaded at its free end to receive the nut 31. Each of the plates 21 is provided with two X-shaped openings 32 disposed in rounded depressions through each of which openings 32 a tie rod 30, eye portion 29, and eye 28 of a fastening means are passed, while the head 26 of such fastening means is disposed in the depression, the head 26 being of a size to prevent its passage through such opening 32. The blocks 13 are each provided with two openings 0, having enlarged upper portions 33 to accommodate the eye portions 29 and eyes 28, and having diminished lower portions 34 through which the shanks of the tie rods 30 extend. The rim 11 and felly 10 are provided with a plurality of alined openings 35 and 36 respectively, through which the tie rods 30 extend, the ends thereof protruding from the inside of the rim 10 on which protruding ends the nuts 31 are secured. The lower portions 34 of the openings 0 and the openings 35 and 36 are sufficiently large to permit free movement of the tie rods therein. By means of the aforesaid fastening means a floating connection is provided for connecting the plates and blocks to the felly and rim of the wheel.

For locking the nuts 31 in place, an arrangement is provided comprising a lever plate 37 fastened at one end by a screw 38 secured to the rim 10 and having at its other end an enlarged portion 39 provided with an opening extending therethrough. In application, the end of the tie rod 30 extends through the opening in such enlarged portion 39. The plate 37, it will be understood, is disposed between the nut 31 and the felly 10. For engagement with the nut 31, an auxiliary lever plate 41 is provided having an elongated slot 42 at one end in which the screw 38 is adapted to coöperate, the other end of the plate 41 being enlarged and formed into a nut-engaging jaw 43. On the lever plate 39 is formed a boss 44 to register with an elongated recess 45 formed in and extending longitudinally of the lever plate 41. In actual application after the nut 31 has been tightly secured to the tie rod 30 the plate 41 may then be drawn out so that the nut-engaging jaw 43 engages the nut 31 and thereupon the screw 38 tightened to lock the lever plate 41 in position. From this arrangement it will be seen that although the inner end of the fastening means may have a slight lateral movement or rather oscillating movement with the screw 38 as a center there is no possibility of such lower end having free longitudinal movement.

For obviating annoying breaks or interruptions in the tread, the blocks 13 and plates 21 are of angular conformation with their adjacent acute ends so disposed alongside of one another that when in the course of the operation of the wheel before one plate portion of the tire tread has receded from the roadbed sufficiently to be entirely clear therefrom, the next or adjacent plate portion will have already come into contact with the roadbed.

The staggered relation of the plates 21 to the blocks 13 which causes each plate to extend over two adjacent raised conformations 17 or two adjacent blocks 13, has the particular advantage, that the destruction of a single fastening means would not in any material way affect the armor, since the plate 21, through which such destroyed fastening means extended, would still be sufficiently secured in place by the other fastening means and locked against lateral movement by the raised conformations 17 of the blocks 13. Furthermore, even if both fastening means of one plate 21 were destroyed or a single plate 21 destroyed so that the same were entirely detached from the blocks 13, the tire would still present an uninterrupted continuous tread that would not materially detract from the efficiency of the wheel, since the blocks 13 disposed under such detached plate would still be sufficiently held in place by the adjacent plates 21 and their raised conformations 17 to then serve as a temporary tread.

The blocks 13 are furthermore provided with the transverse wires 50 and the longitudinal wires 51 to serve as reinforcements.

It is obvious that various changes and modifications may be made to the details of construction without departing from the general spirit of the invention.

I claim:

1. In a device of the character described, the combination with an annular support, of a plurality of resilient blocks disposed on said support, each block comprising two raised conformations with a space between them, a plurality of metallic plates disposed on said blocks and in staggered relation to said blocks, the plates being cup-shaped and extending across two raised conformations of two adjacent blocks, and fastening means for securing said plates and blocks in place.

2. In a device of the character described, the combination with an annular support of a plurality of resilient blocks disposed on said support, each block comprising two raised conformations with a space between them, a plurality of metallic plates disposed on said blocks and in staggered relation to said blocks, the plates being cup-shaped and extending across two raised conformations of two adjacent blocks, fastening means for securing said plates and blocks in place, there being rabbets at the ends of the raised conformations, and there being a depression substantially in the middle of each plate to register with the rabbets of two adjacent blocks.

3. In a device of the character described, the combination with an annular support, of a plurality of resilient blocks disposed on said support each block comprising two raised conformations with a space between them, a plurality of metallic plates disposed on said blocks and in staggered relation to said blocks, the plates being cup-shaped and extending across two raised conformations of two adjacent blocks, and fastening means for securing said plates and blocks in place, said plates being spaced from each other sufficiently to prevent binding when the resilient blocks are compressed.

4. In a device of the character described, the combination with an annular support, of a plurality of resilient blocks disposed on said support each block comprising two raised conformations with a space between them, a plurality of metallic plates disposed on said blocks, the plates being cup-shaped and extending across two raised conformations, there being openings through said support, there being two rounded depressions in each of said plates and an X-shaped opening in each of said depressions, there being openings through each of said blocks each in alinement with one of the openings in a plate and in alinement with the openings in said support, the openings in said blocks being enlarged at their upper ends; lugs having rounded heads disposed in the depressions of said plates and shanks extending down into the enlarged portions of the openings in said blocks, eyes at the lower ends of said shanks, binding rods, hook portions at the upper ends of said binding rods engaging said eyes, said binding rods extending down through said blocks and support and protruding from the inner side of said support, and nuts secured to the protruding ends of said binding rods.

HARRIS WEINER.

Witnesses:
 GUSTAV DREWS,
 H. D. PENNEY.

Copies of this patent may be obtained for five cents each, by addressing the "Commissioner of Patents, Washington, D. C."